United States Patent [19]
Esposito

[11] Patent Number: 4,678,019
[45] Date of Patent: Jul. 7, 1987

[54] GUIDE ELEMENT ESPECIALLY SUITABLE FOR SOLAR GREENHOUSES AND THE LIKE AND PARTICULARLY UTILIZABLE FOR CONTROLLED SHADING

[75] Inventor: Chris Esposito, W. Bayshore, N.Y.

[73] Assignee: Four Season Solar Products Corporation, Holbrook, N.Y.

[21] Appl. No.: 803,550

[22] Filed: Dec. 2, 1985

Related U.S. Application Data

[60] Division of Ser. No. 591,959, Mar. 21, 1984, Pat. No. 4,598,752, which is a continuation-in-part of Ser. No. 455,475, Jan. 4, 1983, Pat. No. 4,596,093.

[51] Int. Cl.$^4$ .............................................. A47H 3/00
[52] U.S. Cl. .................................... 160/272; 254/389; 16/95 R
[58] Field of Search ............. 16/95 R, 95 D; 254/389, 254/390, 417; 160/272, 273 R; 308/3 R

[56] References Cited

U.S. PATENT DOCUMENTS

| | | | |
|---|---|---|---|
| 1,238,360 | 8/1917 | Surber | 160/273 R |
| 3,052,450 | 9/1962 | Trunnell | 254/389 X |
| 3,295,832 | 1/1967 | Fowler | 254/389 |
| 3,347,526 | 10/1967 | Cymmer et al. | 254/389 X |
| 3,379,162 | 4/1968 | Chatten et al. | 254/389 X |
| 3,896,579 | 7/1975 | Benne | 254/389 X |
| 4,325,269 | 4/1982 | Nagano | 254/389 X |

FOREIGN PATENT DOCUMENTS 816724  7/1959  United Kingdom ................ 254/389

Primary Examiner—Carl D. Friedman
Attorney, Agent, or Firm—Roberts, Spiecens & Cohen

[57] ABSTRACT

A structural arrangement which is particularly useful in connection with solar greenhouses is provided. Therein is provided a structural member in the form of a hollow bar of elongated form provided with longitudinally extending and parallel track channels having relatively narrow longitudinally extended slot mouths. A shade with a bulbous periphery is engaged in each of the track channels and a guide member is provided which changes the direction of movement of the shade as it exits from the ends of the corresponding track channels. The guide includes tubular extensions which extend into the track channels. The guide furthermore includes arcuate guide channels which are funnel shaped and operate in extension of the tubular extensions. A member operates in conjunction with the tubular extensions to a wall of the afore-mentioned bars for the mounting of the guide.

7 Claims, 9 Drawing Figures

GUIDE ELEMENT ESPECIALLY SUITABLE FOR SOLAR GREENHOUSES AND THE LIKE AND PARTICULARLY UTILIZABLE FOR CONTROLLED SHADING

OTHER APPLICATIONS

This application is a divisional application of my co-pending application Ser. No. 591,959 filed Mar. 21, 1984 now U.S. Pat. No. 4,598,752 which was a continuation-in-part of my earlier filed co-pending Application Ser. No. 455,475 filed Jan. 4, 1983 now U.S. Pat. No. 4,596,093.

FIELD OF INVENTION

This invention relates to shades for solar greenhouses and the like and more particularly to improved structural members suitable for providing guidance for shading and like types of members.

Commercial systems are available for providing selective shading for solar greenhouses and the like. In one known arrangement, a shade is transferred from one motor driven roller towards a second motor driven roller by straps which are fastened to the leading edge of the shade, these straps being attached to one of the rollers and being wound upon the same to draw the shade from the other roller upon which the shade is coiled and normally stored. In addition, the leading edge of the shade is provided in the form of a rigid member, the edges of which are guided in a channel provided in a guiding member which has no structural function and is intended solely for the purpose of being a shade guide.

An inspection of the available system reveals that the leading rigid element of the aforegoing system extends laterally beyond the lateral edges of the shade so that the lateral edges of the shade are spaced from the guide and thus provide means for an inadvertent passage of solar radiation or the like between the guides and the shade edges. It is also to be noted that the guides have no structural function to be performed as has been noted hereinabove, and that the guides are generally mounted inwardly of the solar greenhouse structure in such a manner as to be readily receptive of inadvertent damaging forces or the like. Moreover, it will be noted that the shade is inconveniently positioned with its lateral edges subject to damage and deterioration.

Also commercially available are shades having lateral edges into which are incorporated wires or cables or the like which give to these lateral edges a conformation which is bulbous in nature. These bulbous lateral edges are accommodated in guiding tracks which heretofore have been exclusively rectilinear and solely vertically disposed. These shades have not been incorporated into solar greenhouses or other such complex structures for purposes of providing selective shielding or shading.

Also commercially available are rollers within which are provided internal motors of generally cylindrical conformation. These motors are utilized for selectively driving the rollers for taking up straps attached to shades or for rewinding shades and the like. Insofar as I am aware, these motor driven rollers have not been utilized in conjunction with the structural members of solar greenhouses or the like in the manner which will be described in greater detail hereinbelow.

SUMMARY OF INVENTION

It is a general object of the invention to provide improved systems and structural members to enable the selective shading and shielding of solar greenhouses and the like.

It is a further object of the invention to provide improved structural elements suitable for use in solar greenhouses and the like in order to provide for ready installation and operation of shading systems and so forth.

Yet another object of the invention is to provide for improved insulating and shading systems for solarium type greenhouses and the like utilizing integral built-in tracks to carry shading fabric so that the fabric may be readily held taut between two such tracks without sag and incorporating guide members which are easily installed and which provide an anti-sage feature.

Yet another object of the invention is to provide an insulating and shading system wherein integral built-in track channels are made accessible at the top and bottom of the tracking system by improved designing of the structural members into which the integral tracks are incorporated.

To achieve the above and other objects of the invention, there is provided an apparatus comprising spaced parallel bars defining parallel channel tracks with facing mouths. A shade extends laterally through the mouths and includes bulbous peripheries accommodated and retained in these tracks. The bars include ends at which the shade selectively enters and exits the tracks. A roller arrangement is operatively associated with the ends to take up and play out the shade. For structural purposes, the roller arrangement is displaced from the bars and, in accordance with the invention, there is provided a guide arrangement to guide a change in direction of the shade as the shade enters or exits the tracks in order to adapt the shade to the relative positions of the roller arrangement and the ends of the bars.

It accordance with a further aspect of the invention, the guide arrangement is provided with open guide tracks for receiving the bulbous peripheries and these guide tracks are of arcuate configuration whereby to change direction of the bulbous peripheries and thereby the direction of the shade. In addition to the aforesaid, the guide tracks on the different bars have proximal lateral guide walls which slope apart in the direction of the ends of the bars whereby to effect a stretching of the shade.

The aforesaid guide tracks may be provided with distal lateral guide walls which slope together in the direction of the ends of the bars and such that the guide tracks are of generally funnel shape.

In accordance with a feature of the invention, the guide tracks are of arcuate cross-section and this cross-section will preferably have a radius which increases in a direction away from the ends of the bars.

In accordance with another feature of the invention, the guide arrangement will include tubular extensions in continuation of the guide tracks, the tubular extensions being accommodated in the channel tracks at the ends of the bars and coupling the guide arrangement to the bars.

In accordance with other aspects of the invention, the bars each include a wall extending between the channel tracks with the guide arrangement including further extensions which with the corresponding tubular extensions straddle the aforementioned wall. The wall may be provided with a threaded opening and the further extensions mentioned hereinabove will be provided with an opening aligned with the threaded opening, the apparatus further including a locking member extending through the openings and engaging in the threaded opening. Still further, the ends of the bars will preferably be sloped relative to the channel tracks and the guide arrangement will include flanges sloped relative to the tubular extensions and in correspondence with the sloped ends.

The aforementioned guide arrangements may be included in single monolithic guide structures. One such guide structure may include a body defining two funnel shaped and generally arcuate guide tracks having generally parallel axes and there may furthermore be provided two parallel tubular extensions on the aforesaid body defining bores aligned in continuation of the guide tracks. These bores will preferably be generally tangentially related to the guide tracks.

In the aforesaid construction, each of the tubular extensions will preferably be provided with a lateral slot extending longitudinally therealong and through which the shade may extend with its periphery being accommodated at least partly in the corresponding tubular extension.

Another feature relates to the provision of a flat extension on the aforesaid body spaced from but parallel with the tubular extensions. Still further, there may be provided a flange on the aforesaid body in sloped relationship to the tubular extensions.

Other feature include that the guide tracks are at least about one-quarter of a circle in extent with the guide tracks being of varying arcuate cross-section which increases in a direction away from the corresponding tubular extensions.

Still another feature of the invention relates to the guide tracks having outer walls which slope at about 10°-45° relative to the associated axes.

The above and other objects, features and advantages of the invention will be found in the detailed description which follows hereinafter, as illustrated in the accompanying drawings.

DETAILED DESCRIPTION

Figure 1:
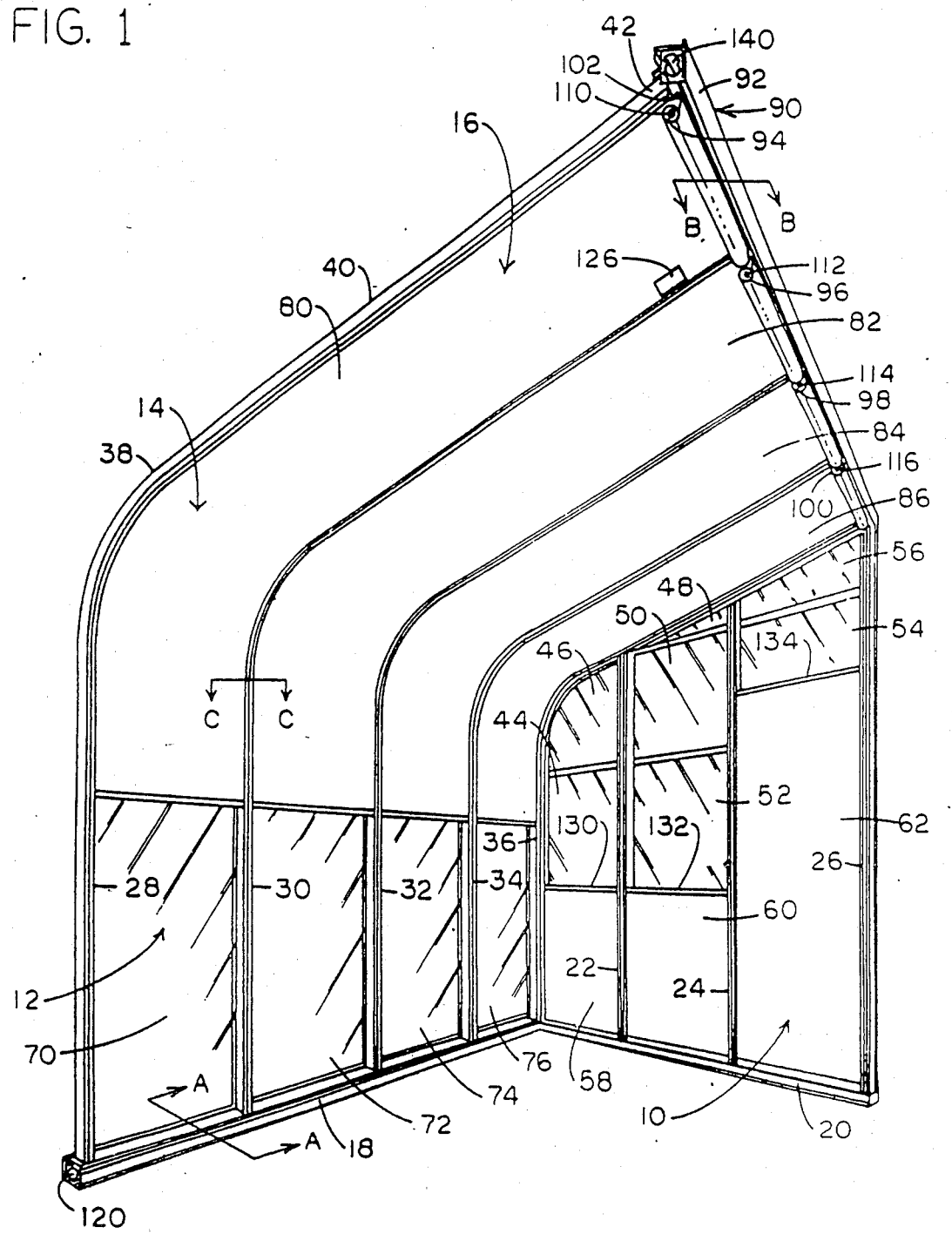
FIG. 1 is an interior perspective view of a portion of a lean-to type solar greenhouse provided with a shading arrangement in accordance with a preferred embodiment of the invention.

In FIG. 1 is illustrated a portion of a lean-to type solar greenhouse of the kind generally shown in the 1982 Theme Catalog entitled Four Seasons Passive Solar Greenhouse and Sun Space published and distributed by Four Seasons Solar Corp. of Farmingdale, N.Y. The illustrated portion of the Solar Greenhouse in FIG. 1 includes a gable end 10 and a front portion 12 having a curved-eave portion 14 and an upper sloped portion 16. Further illustrated are base sills 18 and 20 which may, for example, be mounted on a base wall or flab slab or deck (not shown) with appropriate fasteners. The method of mounting the base sill on the supporting ground is not a feature of the present invention and requires no further description in this text. The gable end 10 includes a plurality of parallel vertical glazing bars such as indicated at 22, 24, and 26. The bar 26 is in abutting relationship against the side of a dwelling or some other such similar construction. The front portion 12 includes a plurality of vertical glazing bars 28, 30, 32, 34 and 36. The glazing bar 36 furthermore provides a connection with gable end 10.

To conform with the shape of the glazing, which it is the purpose of the glazing bars to support, the glazing bar 28 has a curved section 38 and a sloped section 40. It terminates in an end portion 42. Glazing bars 28, 30, 32, 34 and 36 have similar curved and sloped portions.

Glazing panes as comprised by the gable end 10 are indicated in various forms at 44, 46, 48, 50, 52, 54 and 56. Portions of the glazing are concealed by shade fabric as indicated at 58, 60 and 62. The dwelling or other structure against which the solar greenhouse is mounted is not shown as its construction is not essential to an understanding of the present invention.

The glazing included in the front portion 12 includes glazing panes 70, 72, 74 and 76. The remaining glazing in FIG. 1 is concealed by shade fabric or shades 80, 82, 84 and 86. The number of shades and panels in FIG. 1 is illustrative only as a greater or lesser number of panels and glazing panes may be employed in accordance with the invention which is not limited thereby.

At the upper end of the solar greenhouse construction, is located a ridge structure 90. It engages the end portion of the glazing bars at the upper extremities thereof such as indicated at 42 to support and accommodate the same. The ridge structure 90 abuts at the back wall 92 against the dwelling other similar structure associated therewith as does the vertical glazing bar 26 of the gable end 10.

Also appearing in FIG. 1 is a representative sequence of rollers 94, 96, 98 and 100. These rollers in the illustrated embodiment are source rollers of shade fabric which store and supply the rolled up shade fabric upon demand. Further illustrated in FIG. 1 is a guide roll arrangement 102 which guides the shades or shade fabric in a change of direction so that the edges of these shades or fabrics may be engaged in track channels provided in the vertical glazing bars as will be described in greater detail hereinbelow. It is to be noted in the diagrammatic illustration of source rollers 94, 96, 98 and 100 that interior motors 110, 112, 114 and 116 are shown. These motors are contained and concealed within the rollers and operate to drive the same. Rollers with internal motors to drive the same are commercially available. They may be obtained from Somfy Systems, Inc. of Edison, N.J. The motors are of a asynchronous capacitor start and run, single phase type rated at 120 V. and 60 Hz. They are thermally protected totally enclosed brushless type motors equipped with permanently lubricated bearings requiring no maintenance and being relatively easy to wire. They include solenoid activated disc brakes which automatically stop and hold a load in any position without slippage whenever current to the motor is interrupted. The locking action assures safety and reliability of operation of the motorized system. The system can be provided with a limit switch to set the exact length of travel in both up and down directions automatically. A planetary type gear system is employed to lower motor speed and improve torque. Other details of the motor system can be found in U.S. Pat. No. 3,718,215.

The upper motorized rollers cooperate with corresponding motorized rollers concealed in the base sill 18. In the illustration, one motorized system is exposed by the cutaway such as, for example, seen at 120. The arrangement is such that, when the rollers in the sill 18 are operated to draw shade fabric downwardly, the motorized roller systems indicated at 94, 96, 98 and 100 permit the withdrawing of shades therefrom. The electrical system and operation is reversed when the shade 80, 82, 84 and 86 are to be drawn upwardly. In this case, the motorized systems indicated at 94, 96. 98 and 100 are actuated and the concealed systems in the base sill 18 release the material for being rolled back upon the upper rollers to expose greater and greater amounts of the glazing as the operation continues. Also illustrated in FIG. 1, in diagrammatic form, is a photoelectric sensor 126. This photoelectric sensor is coupled in an electric circuit (not shown) connected with the aforementioned motors in order to drive the same in one or the other rotary directions as may be required. The photoelectric sensor 126 is representative only of any device capable of sensing an ambient condition such as solar radiation, temperature, wind and the like for purposes of automating the operation of the rollers. It will be noted, however, that while the motorized roller systems are employed in accordance with the preferred embodiment of the invention, it is also possible that the shades be operated manually and also in connection with spring loaded rollers as is the case in connection with domestic shades as are commonly and commercially available. In fact, a manually operated shade arranged is indicated in association with end 10. Thus, there are no upper rollers associated with shades 58, 60 and 62, these being drawn from concealed rollers and base still 20 by a manual operation of grasping rigid leading edge members indicated by way of example at 130, 132 and 134.

Also exposed in the illustration of FIG. 1 in diagrammatic form is a blower 140. The purpose of this blower (as will be illustrated and described in greater detail hereinbelow)is to evacuate air from between the shade and the associated glazing and to expell this air into the ambient atmosphere via an appropriate vent in order to reduce the temperature which prevails between the shades and the glazing thereby to reduce the possibility of damage to the glazing.

Figure 2:
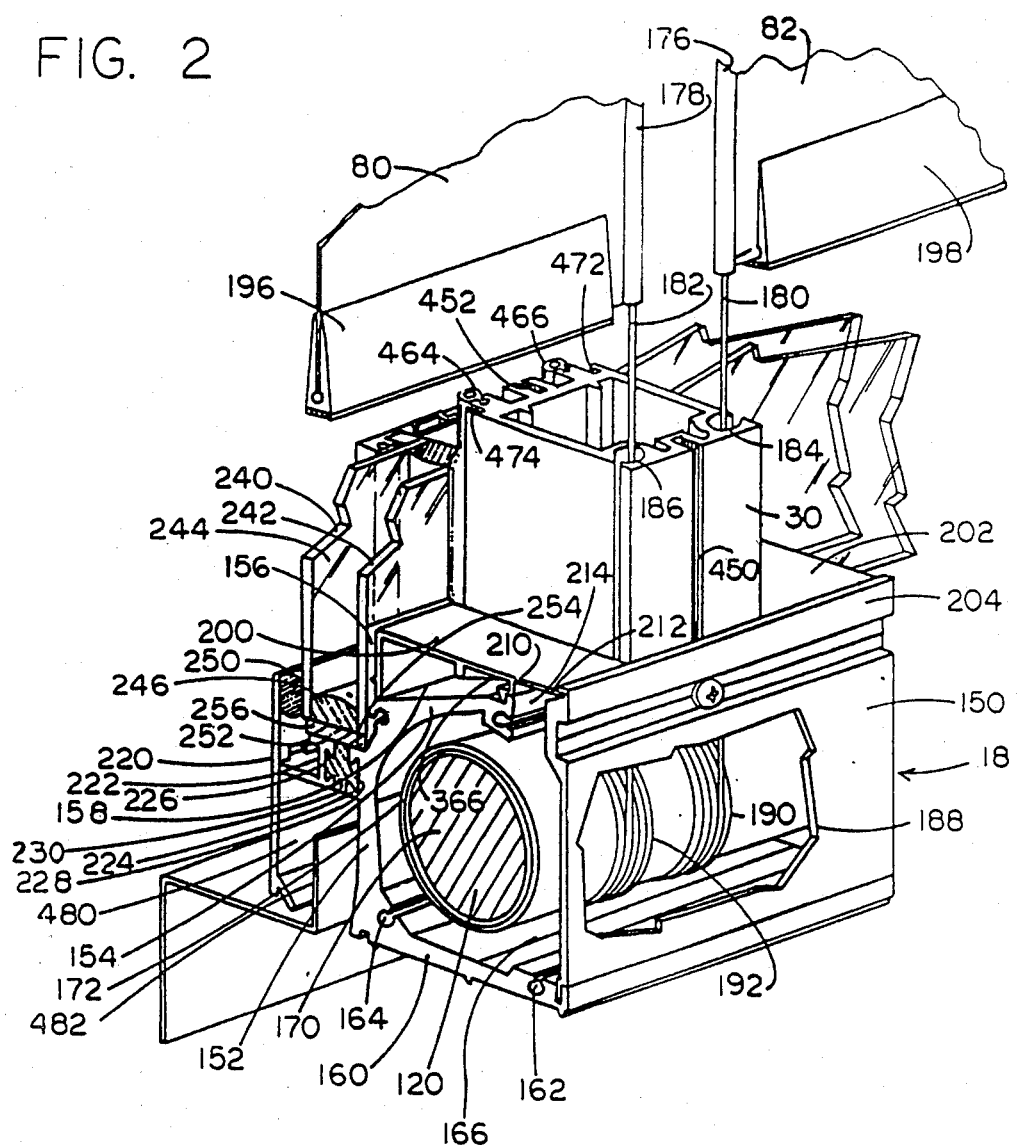
FIG. 2 is a partly diagrammatic and perspective view of a broken-away protion of the bottom sill construction embodied in the structure of FIG. 1 in correspondence with line A—A in FIG. 1.

FIG. 2 illustrates on an enlarged scale a broken-away portion of the structure illustrated in FIG. 1 with conditions somewhat altered to show a more lowered condition of the shades. For purposes of orientation, it will be seen in FIG. 2 that there are illustrated base sill 18, vertical glazing bar 30 and shades 80 and 82. The base sill 18 includes an inner wall 150 and a first outer wall 152. The outer wall 152 supports a sloped upper wall 154 from which extends a vertical wall 156. The walls 154 and 156 cooperate to define a moisture drain 158. A bottom wall 160 extends between and connects the inner wall 150 with the outer wall 152. Drainage channels 162 and 164 are provided in horizontal disposition within the internal chamber 166 which is cooperatively defined by walls 150, 152, 154 and 160. Within the chamber 166 is accommodated the motorized roller system including the internal motor 170 and the encircling roller 172.

Each of the shades illustrated includes a bulbous lateral edge portion for purposes of being accommodated in and guided by track channels to be referred to hereinbelow. Illustrative bulbous lateral edge portions or peripheries are indicated at 176 and 178 in FIG. 2. These constructions are commercially available and are generally of the type including wires extending through the bulbous peripheries and axially extending out of the same. Two such wires or cables are indicated at 180 and 182 in FIG. 2. They extend through and are guided by track channels 184 and 186 as will be described in greater detail hereinbelow. It is to be noted that, by reason of break-away portion 188, it is possible to see that these cables are attached to would onto roller 172 such as indicated 190 and 192. A winding up of these cables on the roller 172 causes the shades 80 and 82 to be drawn down towards the base sill 18 thereby to effect a greater degree of shading. This means that solar radiation passing through the glazing which is permeable thereto may be intercepted by the shades thereby to effect a greater or lesser degree of shielding as desired and as may be manually or automatically controlled. It will also be noted in FIG. 2 that the shades 80 and 82 are provided with rigid lead members 196 and 198. These members, at their extreme downward movement, come into abutting or substantially abutting relationship with cap elements 200 and 202 which are intended to cover drains such as indicated at 158 and to conceal the internal construction of the base sill 18 from viewing or from the damaging impact of dropped articles or the like. The caps 200 and 202 also constitute safety features inasmuch as they resist the penetration of probing fingers and the like which might otherwise be damaged by engagement with moving parts within the base sill 18 under inadvertent circumstances.

The cap members 200 and 202 extend generally from the vertical wall 156 to the upper lip 204 of the front wall 150. This is satisfactory in the case where the cables, such as indicated 180 and 182, extend through the glazing bar to the internal roller 172 which in this case acts take-up roller. In these circumstances, there is no need for the lead members 196 and 198 to move into the internal chamber 166 nor is there any need for the shade 80 or 82 to do likewise. In the event that it is desired to alter the construction so that the shade 80 and 82 can be directly taken-up on the roller 172 in addition to the cables 180 and 182 which they trail, the construction can be readily modified to provide a slot through which the shade 80 and 82 may pass. Thus, for example, the cap member 200 is provided with a notch 210 providing a break-away section 212 to expose a slot or passage 214 illustrative of a passageway through which the shades may enter the internal chamber 166 for engagement and being taken-up upon an associated roller. Thus, the invention includes the options whereby it is exclusively the cables which are taken-up on the lowermost roller or rollers or whereby the shades themselves are taken-up upon such roller or rollers.

FIG. 2 furthermore illustrates a second outer wall 220. This outer wall includes a protrusion 222 in facing relationship with a protrusion 224 on the outer wall 152. These two protrusions are provided with facing grooves 226 and 228 which have reentrant angles therein so that a thermal break member 230 having the form of a Maltese cross may be entrapped therein to prevent the flow of heat from the wall 152 to the wall 220.

The glazing is illustratively shown in the form of a double paned glass or plastic structure, the spaced panes being indicated at 240 and 242 with a spacing 244 therebetween To maintain this spacing, there is provided a spacer 246. The pane 242 rests against the vertical wall 156 and the glazing as a whole is entrapped between the walls 156 and 220 by means of a gasket 250 of a thermally insulative type. The upper walls of protrusions 222 and 224 define a platform at 252 and 254 upon which rests a pad 256 upon which rest the glazing and the spacer 246.

Further reference to the construction of the vertical glazing bar 30 will be made hereinbelow since the construction of this bar and other like bars in the strucutre constitute a significant feature of the invention, especially as regards the provision of the track channels 184 and 186. Before this discussion is undertaken, however, reference will next be made to FIGS. 3 and 4 which illustrate, in greater detail and/or diagrammatically, some of the features of the ridge structure 90 appearing in FIG. 1. For purposes of orientation, attention is drawn in FIGS. 3 and 4 to vertical glazing bar 30, shades 80 and 82, motorized roller system 94, guide roll 102 and blower system 140 which have been mentioned hereinabove. A guide 121 is shown in diagrammatic form in FIG. 3 and its details will be later explained.

From what has been stated above, it will not be obvious that the glazing bars constitute supporting members or structures for the glazing. These supporting members are accommodated in and rest against the ridge structure 90. They provide track channels for receiving and guiding the respective shades. The ridge member 90 is structurally and functionally related therewith in a manner next to be described below.

Ridge structure 90 includes a rear wall 300 consisting of upper and lower parts 302 and 304. The upper and lower parts are connected through the intermediary of a thermal break member 306 which is made of insulative material accommodated in appropriate receptacles 308 and 310 respectively provided on the upper and lower parts 302 and 304. The ridge structure 90 also include upper wall 312 and lower wall 314. Moreover, it includes a front wall indicated at 316. Cooperatively, these walls define an internal chamber 318 within which is accommodated the blower 140.

The front wall 316 is provided with a vent indicated generally at 320. Associated with this vent is a removable shutter 322 which may be employed, for example, during cold weather seasons to shut off the escape of air from within the solar greenhouse. The front wall 316 has an auxiliary portion 324 connected thereto through the intermediary of a thermal break member 326. This auxiliary member 324 supports a receptacle 328 which is a glazing receptacle to accommodate and support appropriate glazing panels at the upper extremity of the front portion of the glazing of the solar greenhouse. An examplary panel is diagrammatically illustrated at 330. It may consist of spaced panes 332 and 334 separated, for example, by a spacer 336. The panel 330 is held in place by a gasket shown at 338. A screen for preventing the influx of insects and the like is indicated at 340. It is associated with the vent 320. A second vent is indicated at 342. Cooperating therewith is a gravity operated flap 344 which likewise prevents the influx of foreign matter. The strength of the flow of air passing outwardly through the vent 342 is sufficient to open the flap 344 to the extent required.

Figure 4:
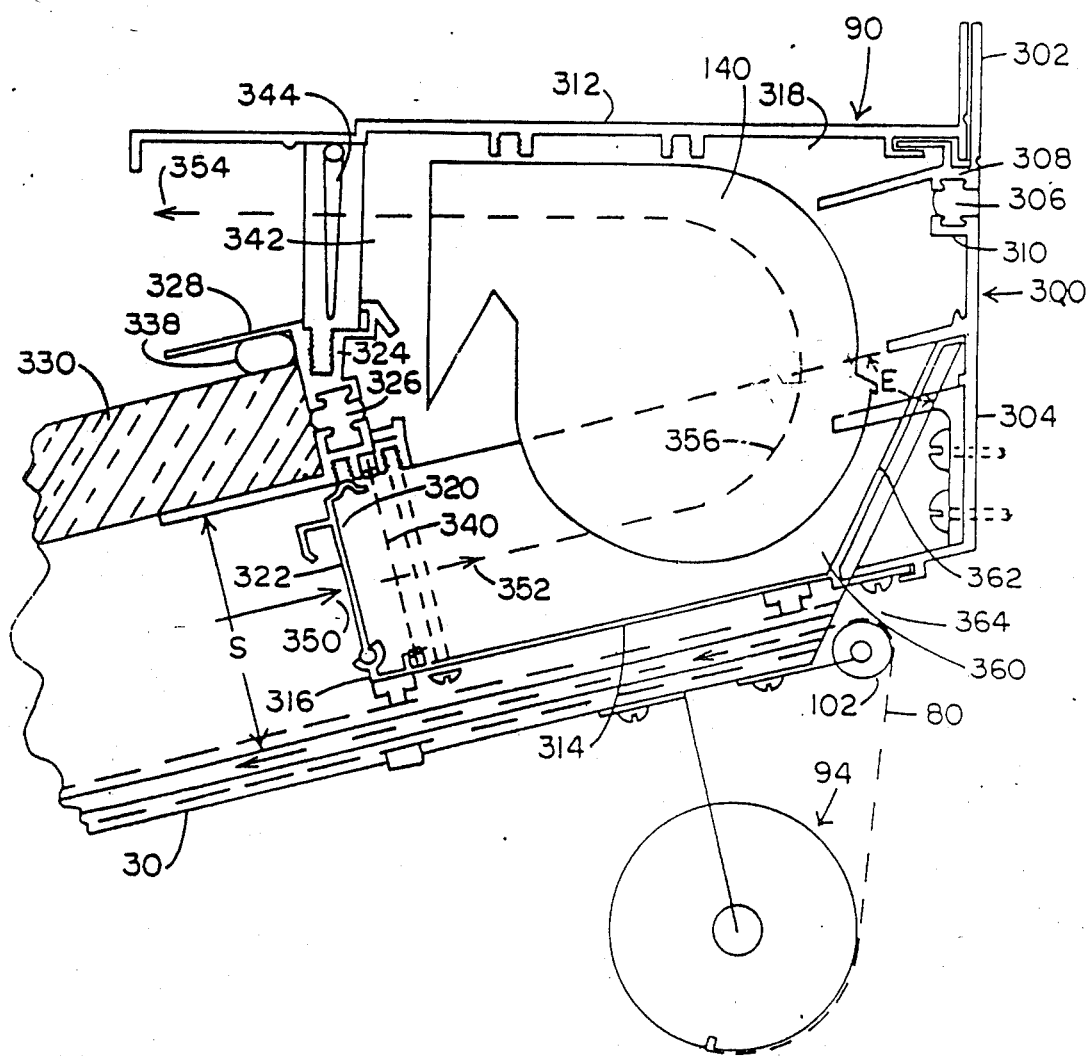
FIG. 4 is a partially diagramatic view corresponding to section line B—B of FIG. 1.

FIG. 4 specifically illustrates the flow of air. Flow through the vent 320 is indicated by arrows 350 and 352. Flow of air through vent 342 is indicated by arrow 354. The circuitous route is indicated by dotted line path 356. It will now be noted that the utilization of the glazing bar with its track channels 184 and 186 and the function of supporting the associated glazing defines a space between the shades and glazing. This space is indicated in FIG. 4 at S. This spacing S is a minimum of about 1½ inches. It is intended to assist in limiting the temperature which air entrapped between the glazing and shade may reach. This function is further accomplished by the utilization of the blower 140 which displaces or withdraws air from between the glazing and the shades and propels this air along the route 356 through the vent 320 and expels this air into ambient atmosphere through the vent 342. The the ridge structure and its blower cooperate with the glazing bar and the shades in both a structurally supportative and temperature controlling manner.

It will not be noted that the end portion 360 at the upper extremity of the glazing bar 30 has an extremity indicated at 362 which is angularly related both to the longitudinal axis of bar 30 and to the rear wall 304 of the ridge structure 90. This is intended to provide a space 364 within which to accommodate at least a partial intrusion of the guide roll 102. Thus the guide roll 102 may be conveniently positioned to guide the shade 80 from the roller system 94 into the associated track channels.

Similarly, the bottom extremity of the glazing bar 30 as indicated at 366 in FIG. 2 is angularly related to the walls between which it extends. The purpose of this angular construction is different from that at the upper extremity. It is intended to provide an appropriate relationship with the drain 158 thereby to permit a proper resting of the bottom extremity of bar 130 on the upper wall 154 and to permit an ease in installing the glazing bar 30 when the structure is being assembled.

Figure 3:
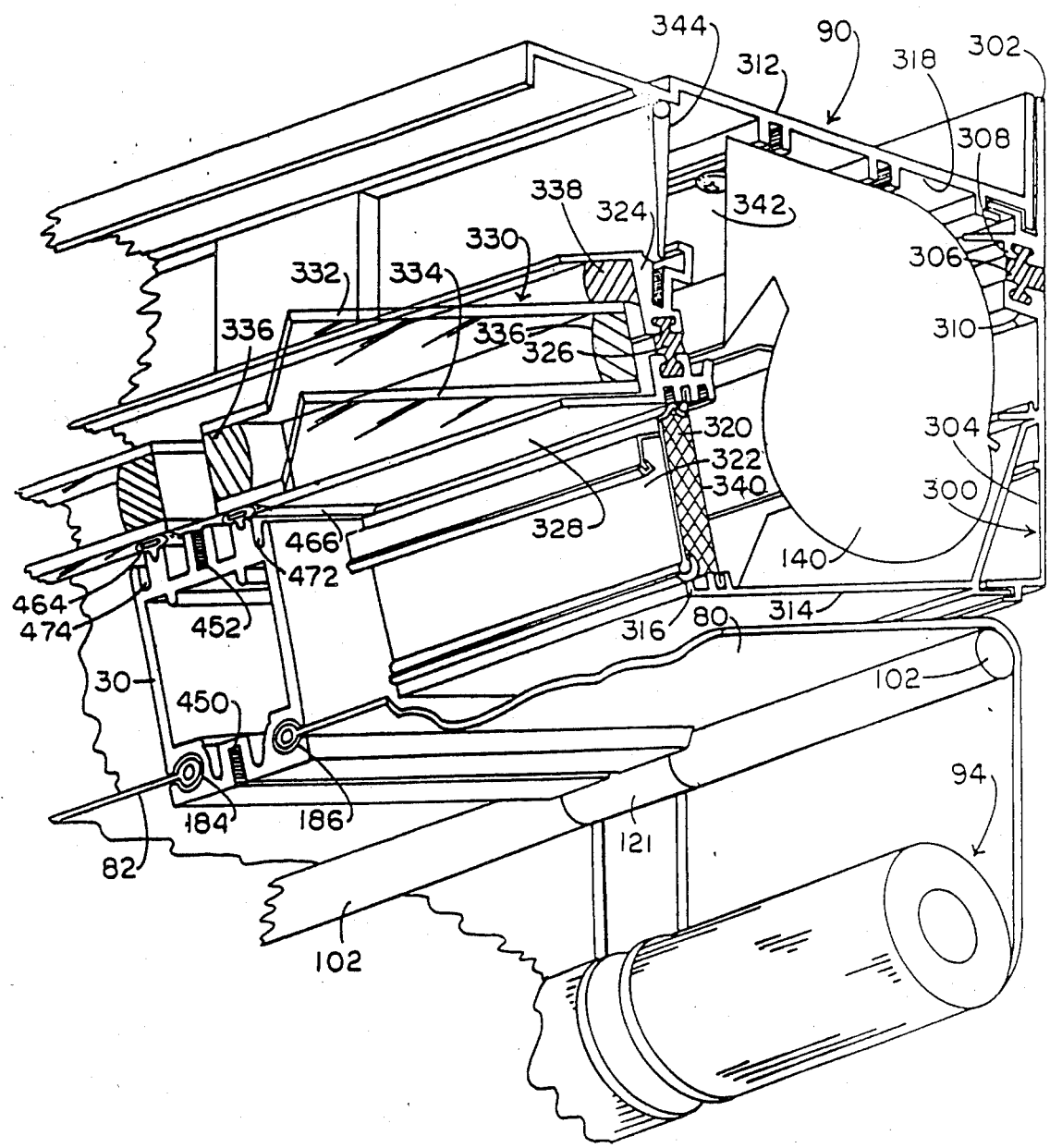
FIG. 3 is a view of the ridge structure of FIG. 1 in correspondence with line B—B therein, the view being on enlarged scale and being partially diagrammatic in nature.
Figure 5:
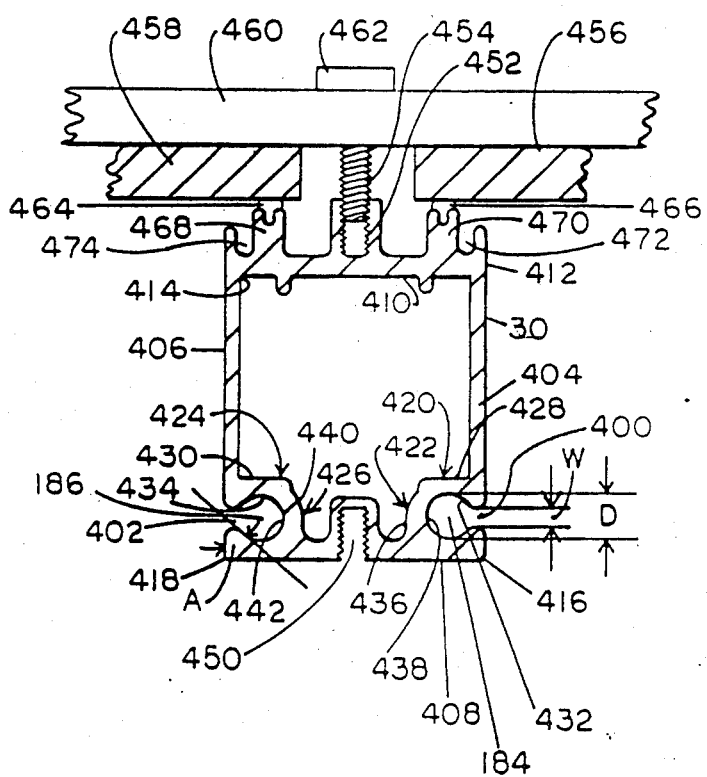
FIG. 5 is a sectional view corresponding to line C—C in FIG. 1 but further illustrating a glazing and muntin connected thereto.

An examination of FIG. 5, which is in part, a section of glazing bar 30, will next be undertaken in conjunction with an understanding of FIGS. 2, 3, and 4. In FIG. 5 appears the track channels 184 and 186. By reference to the other figures, it will be understood that these channels extend longitudinally through the glazing bar which is itself an extended member. Associated with the channel 184 is a mouth 400. Associated with the track channel 180 is a mouth 402. These mouths are of relatively restricted dimensions. They form and constitute slots extending longitudinally along the glazing bar 30. The track channels 184 and 186 are in a preferred embodiment of the invention preferably of circular conformation. An example diameter of these track channels is indicated at D. The width of the associated mouths 400 and 402 is indicated by way of example at W. The arrangement is such, that the width W is preferably no more than 50% of the dimension D. This, in effect, forms a reentrant angle indicated, by way of example, at A. The purpose of this is to form a track channel in which the bulbous periphery of the associated lateral edges of the corresponding shades are entrapped. This entrapment coupled with appropriate spacing of pairs of associated glazing bars enables the shades to be held in taut condition thereby avoiding sagging and the like. It also enables the bulbous portions to be vigorously guided along appropriate paths even as these paths turn through an angle associated with the curved eave portions of the overall construction. Thus the use of associated guide rolls or the like in the vicinity of the curved eave portions is avoided.

It will be noted that the glazing bar include two side walls 404 and 406. These side walls extend between and connect inner wall 408 and outer wall 410. The arrangement of the wall is such that the glazing bar is in its preferred form quadrilateral in cross-section thereby defining four corners indicated in the drawing at 412, 414, 416 and 418. The track channels 184 and 186 are generally located at the corners 416 and 418. They are furthermore formed by interior walls indicated at 420, 422, 424 and 426. The walls 420 and 424, which partly define channels 184 and 186, have surfaces 428 and 430 which are flat. They also have surfaces 432 and 434 which conform to the shape of the channels. On the other hand, wall 422 has surfaces 436 and 438 both of which conform to the shape of the associated channel. Wall 428 likewise has surfaces 440 and 442 which conform to the shape of the associated channel 186.

In the wall 408 is provided a screw threaded groove 450. By means of this groove, attachments of various types may be provided by fastening members threadably engaged therein to provide for the connection or hanging of various types of auxiliary members or elements on the interior of the solar greenhouse. A corresponding grooved slot 452 is provided in wall 410. This provides for the utilization of fastening member 454 to sandwich glazing panes, for example, 456 and 458 against the supporting structure by means of a muntin 460 or clamping member which is entrapped by the head 462 to sandwich the glazing against the sealing member 464 and 466 accommodated in sealing receptacles 468 and 470 mounted on the outer wall 410 and constituting an integral part thereof. It will be furthermore noted that the wall 410 is provided with drainage grooves 472 and 474. The provision of these sealing receptacles and drainage has been heretofore available, but never in association with track channels and never for the partial purpose for extablishing a rigid spacing therebetween so as to provide a well defined spacing between a glazing and a associated shade arrangement as in accordance with the present invention.

Reference to FIG. 2 will show the orientation of screw threaded grooves 450 and 452 as well as seals 464 and 466 accommodated in their respective receptacles. The illustration will also show the orientation of drainage grooves 472 and 474. Not heretofore mentioned with respect to FIG. 2 is the chamber 480 defined between outer walls 152 and 220. This provides an accommodation for the upper extremity of flashing 482 the purpose of which is to provide a weather seal as between the bottom of the base sill 18 and the exterior supporting ground or other such construction.

Reference to FIG. 3 will likewise show the orientation of screw threaded grooves 450 and 452 as well as of sealing members 464 and 466 as well as drainage grooves 472 and 474.

From what has been stated above, it will be readily understood that the support arrangement of the invention, when utilized in connection with glazing or the like includes a plurality of spaced parallel glazing bars, each provided with two of the afore-described track channels. These track channels are arranged in cooperating pairs and in parallel and are such that respective shades extend between these channels with the bulbous peripheries of the shades being entrapped in slidable engagement therein.

The guide arrangement provided in accordance with the invention will provide a plurality of guides intended to cooperate with the aforementioned glazing bars and track channels in a manner which will become hereinafter apparent. One guide is provided as a cap for each of the aforesaid glazing bars. Each cap is intended to cooperate with the bulbous peripheries of two adjacent shades. Furthermore, each guide is intended to engage in and mate with the cooperating glazing bar and to provide for appropriate orientation therewith, as well as for a change of direction of the bulbous peripheries of the respective shades as they exit from or enter into the track channel provided in the glazing bars.

Figure 6:
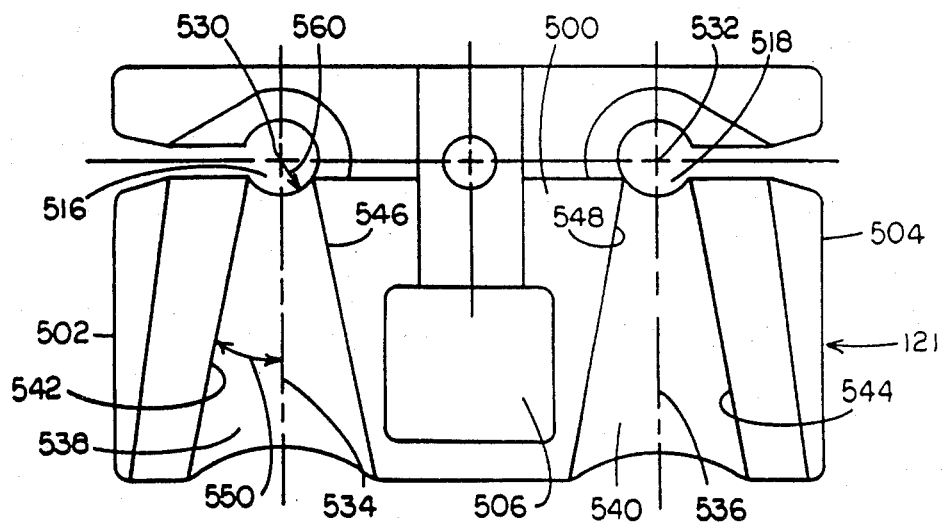
FIG. 6 is a top view of a guide constituting an element of the invention utilized in connection with the aforegoing structure.
Figure 7:
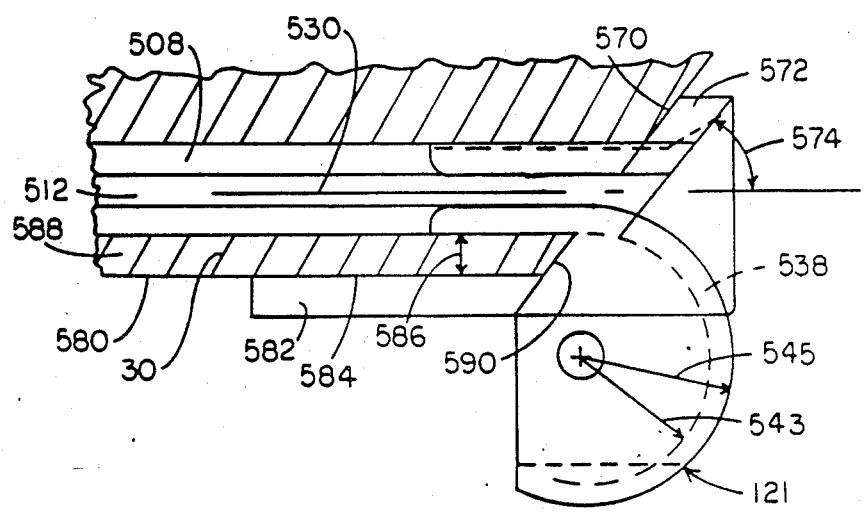
FIG. 7 is a side view of the guide of FIG. 6 illustrating its cooperation with a glazing bar shown partially broken-away and in sections.
Figure 8:
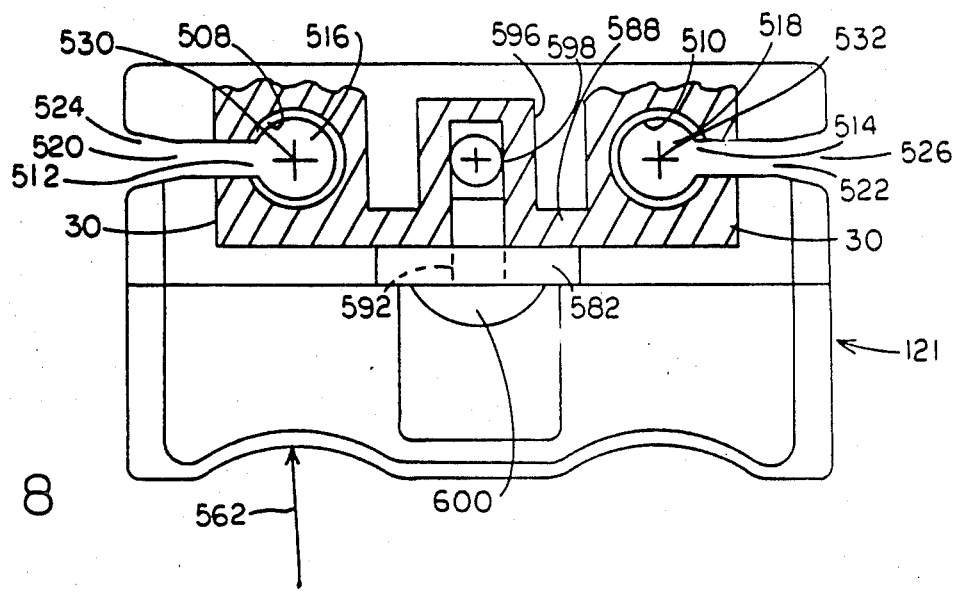
FIG. 8 is a bottom view of the guide of FIG. 8 illustrating its cooperation with a glazing bar as in FIG. 7.

The details of such guide 121 is illustrated in detail in FIGS. 6–8 wherein it is seen that the guide is formed of a body 500 having lateral edges 502 and 504 and in which is provided a square opening 506. Mounted on the body 500 are a pair of tubular extensions 508 and 510. These tubular extensions are provided with lateral longitudinally extending slits or slots 512 and 514. They are arranged to be in a substantially common plane and to correspond with the mouths in the corresponding track channels of glazing bar 30. Thus, the bulbous peripheries of the two corresponding shades may be accommodated in the internal circular bores 516 and 518 of tubular extensions 508 and 510 whereas the planar portion of the corresponding shades may extend through the slots 512 and 514. To augment the function of these slots, the body 500 is furthermore provided with laterally extending slots 520 and 522, the mouths 524 and 526 of which are flared to accommodate minor distortions of the shades as they pass into the tubular extensions with the bulbous peripheries thereon.

The bores 516 and 518 and tubular extensions 508 and 510 are provided with parallel axes of symmetry indicated at 530 and 522. Extending orthogonally therethrough are two axes 534 and 536 which constitute axes or planes of symmetry for two funnel shaped tracks 538 and 540. These funnel shaped tracks (which are spaced from lateral edges 502 and 504) are open troughs which are extensions of the bores 516 and 518. They are at least one-quarter of a circle in extent and in the illustrated embodiment are substantially of an extent of about one half of a circle. The purpose of these guide tracks 538 and 540 is to guide the change of direction of the bulbous peripheries of the associated shades as they pass into or out of the bores 516 and 518. For this purpose, the tracks 538 and 540 are substantially tangential to the tubular extensions 508 and 510 and the bores 516 and 518 thereof.

The tracks 538 and 540 have respective outer walls 542 and 544, as well as respective inner walls 546 and 548. These walls slope symmetrically at an angle 550 relative to axis 534 or 536 which is preferably comprised within the range of 10°-45°. The most functional of these walls are the walls 542 and 544 which walls are proximal to the corresponding walls on the next continguous guides (not shown) included in the guide arrangement and intended to function with respect to the same shades as are engaged in the illustrated guide 121. As will be explained in greater detail hereinbelow, the outer or proximal walls 542 and 544 are intended to guide the bulbous peripheries into the bores 516 and 518, while at the same time exerting a stretching force on the corresponding shades. This stretching force constitutes an anti-sage feature provided in accordance with the present invention.

The guide tracks 538 and 540 have radii 543 and 545 which in the preferred embodiment are about 0.420 and 0.500 inches respectively.

The guide tracks 538 and 540 are also of a gradually varying radius. The radius of the tubular extensions is indicated by way of example at 560. The radius adjacent the end of the guide track, which is distal with respect to the corresponding tubular extension, is indicated at 562. By way of example, the radius 560, in a preferred embodiment of the invention, is 0.1375 inches, while the radius 562 is 1.250 inches. The radius 560 is equal to one half of the diameter of the bores 516 and 518.

The upper end of glazing bar 30 is indicated at 570. This end is sloped relative to the longitudinal axis of the glazing bar and is equally sloped relative to the axis 530. To nest against the end 570 the guide of the invention is provided with a sloped flage 572. The end 570 and the flange 572 slope at an angle 574 relative to the axis 530, this angle may be, for example, in the order of magnitude of 60° and is preferably within the range of 45°-75°.

Nesting against the face 580 of glazing bar 30 is a flat or planar extension 582 which extends from the body 500. Extension 582 has a face 584 which is flat and in face-to-face engagement with the face 580. The face 584 is spaced from the corresponding tubular extensions by a distance indicated at 586. This distance is adequate to permit the tubular extensions and the flat extension 582 to straddle the wall 588 of the glazing bar thereby to clamp the guide in position with the flange 572 resting in nesting relationship against the end 570. Furthermore, the body is provided with a sloped section 590 which also rests against the sloped end 570.

Extension 582 is provided with an opening 592. The wall 588 of glazing rod 30 is provided with a portion 596 in which is provided a threaded opening 598. The opening 592 and the opening 598 are provided in aligned relationship to accommodate a bolt or locking member 600 by means of which the guide may be locked in position atop the associated glazing bar.

Figure 9:
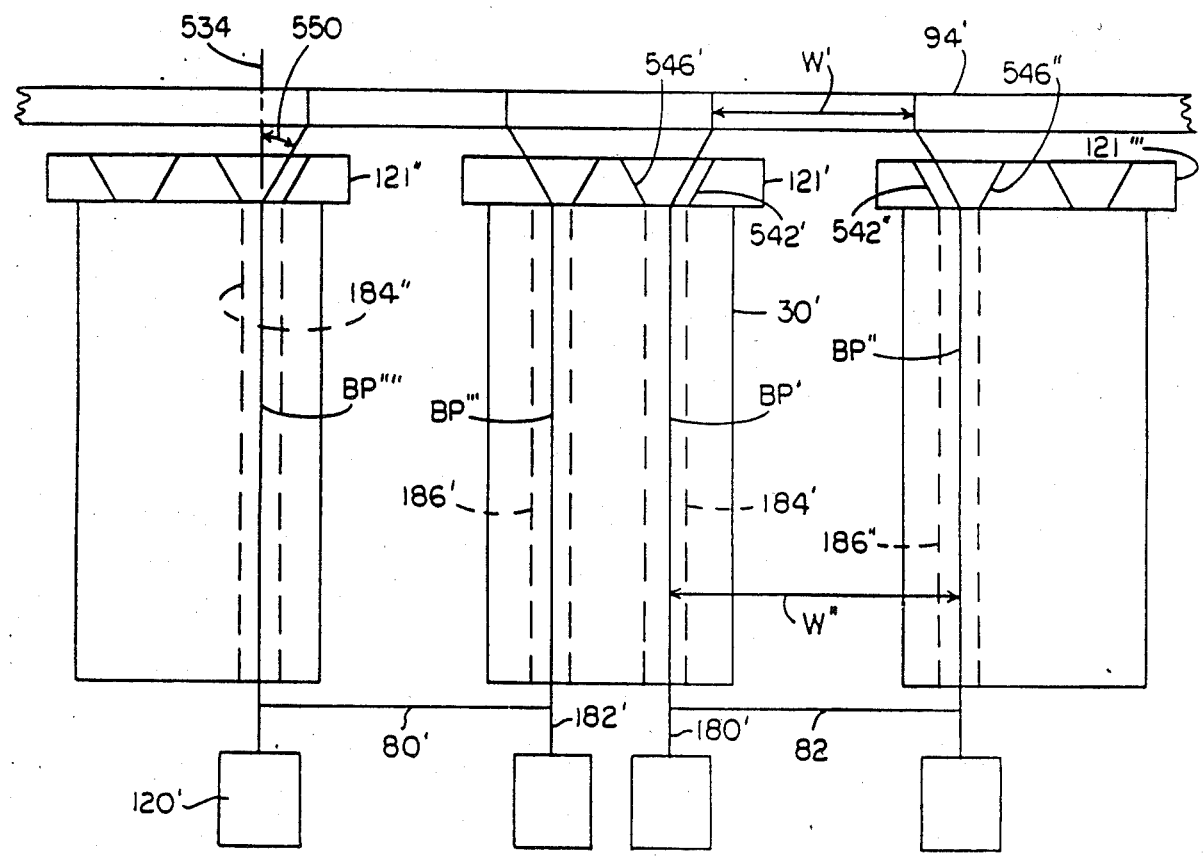
FIG. 9 is a diagrammatic view illustrating the operation of the guide means in cooperation with the other structures of the invention.

From the description given above, it will be seen that the guides 121, the details of which are illustrated in FIGS. 6-8, provides for a change in direction of the shade and its bulbous peripheries. Such a change in direction is illustrated in general manner in FIGS. 3 and 4. The guide is preferably a monolithic structure fabricated of a suitable plastic or of metal. The cooperation of a plurality of these guides is diagrammatically illustrated in FIG. 9 wherein, for purposes of orientation, some primed reference numerals are employed to enable considering the following explanation in view of structure which has been previously described. Thus, for example, in FIG. 9 appear shades 80' and 82' as well as guides 121', 121" and 121'''. Furthermore shown are take-up rollers 121' and uppermost take-up roller 94'. It will be noted, of course, that while one roller 94' is illustrated in FIG. 9, that a series of such rollers corresponding to the respective shades might be readily employed in substitution therefor. Furthermore shown in FIG. 9 are glazing bars 30' provided with track channels or channel tracks 184' and 186'.

The curved guide tracks are generally radially offset relative to the associated roller 94'. Proximal walls of the tracks are indicated at 542' and 542". Distal walls are indicated by way of example at 546' and 546". Thus, it will be seen that the proximal walls are cooperating walls of two adjacent guides whereas the distal walls 546' and 546" are arranged in this pair of guides.

From the illustration in FIG. 9 it will furthermore be noted that the bulbous peripheries BP' and BP" are engaged in the channel tracks 184' and 186" relative to shade 82' whereas the bulbous peripheries of shade 80', which are indicated at BP''' and BP'''', are respectively accommodated in channel tracks 186' and 184".

When, for example, the shade 82' is engaged on roller 94', its width may be, for example, as shown at W'. Thereafter, its bulbous peripheries BP' and BP" pass along proximal walls 542' and 542" whereby the bulbous peripheries are fanned out for subsequent accommodation in the tubular extensions 508 or 510 and thereafter in track channels 184' and 186". This will cause an increase in width of the shade from that indicated at W' to the width indicated at W". This constitutes the leading feature of the anti-sag characteristic of the novel structure of the guide arrangement of the invention, which also simultaneously performs the function of providing a change in direction, as has been referred to hereinabove as being shown in FIGS. 3 and 4. The cap or guard provided in accordance with the invention, is also well oriented with respect to the associated glazing bar. The tubular extensions operating in conjunction with the flat extension 582 provide a bracketing device which traverses one of the walls of the associated glazing bar to hold the guide firmly in position. This characteristic feature is further enhanced by the provision of the flange 572 and the sloped wall 590. The smooth continuation or transition of the bulbous peripheries from within the glazing bar to the take-up roller and vice versa is well provided for by the insertion of the tubular extensions 508 and 510 into the associated channel tracks of the glazing bar 30. An anchoring of the guide device is afforded by the utilization of locking device 600 which passes through opening 592 in extension 582 to be received and accommodated in threaded opening 598. The lateral extension of the shades into the guide device is well provided for by openings 524 and 526 as well as by the lateral slots 512 and 514 provided in the tubular extensions.

There will not be obvious to those skilled in the art many modificiations and variations of the structures set forth hereinabove. These modification and variations will not depart from the scope of the invention, if defined by the following claims.

What is claimed is:

1. A guide comprising a body having lateral edges and defining two funnel shaped and generally arcuate guide tracks having generally parallel axes, said tracks being spaced from said edges and in the shape of open troughs, and two parallel tubular extensions on said body defining bores aligned in continuation of said guide tracks, said bores being generally tangentially related to said guide tracks, said tubular extensions being each provided with a lateral slot extending longitudinally therealong, said body being provided with slots extending from said lateral edges and corresponding with the slots in said tubular extensions.

2. A guide as claimed in claim 1 comprising a flat extension on said body spaced from but parallel with said tubular extensions.

3. A guide as claimed in claim 2 comprising a flange on said body in sloped relation to said tubular extensions.

4. A guide as claimed in claim 3, wherein said body, tubular extensions, flat extensions and flange are part of a monolithic structure.

5. A guide as claimed in claim 1 wherein said guide tracks are at least about one-quarter or a circle.

6. A guide as claimed in claim 5, wherein said guide tracks are of varying arcuate cross-section which increases in a direction away from the corresponding tubular extensions.

7. A guide as claimed in claim 1, wherein the guide tracks have outer walls which slope at about 10°–45° relative to the associated axis.

* * * * *